United States Patent
Bute et al.

(10) Patent No.: US 10,042,841 B2
(45) Date of Patent: Aug. 7, 2018

(54) USER BASED TEXT PREDICTION

(71) Applicant: International Business Machines Corporation, Armonk, NY (US)

(72) Inventors: Yogesh A. Bute, Pune (IN); Sandip P. Thube, Pune (IN)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 14/802,465

(22) Filed: Jul. 17, 2015

(65) Prior Publication Data
US 2017/0017637 A1    Jan. 19, 2017

(51) Int. Cl.
*G06F 17/21*    (2006.01)
*G06F 17/27*    (2006.01)
(Continued)

(52) U.S. Cl.
CPC ........ *G06F 17/276* (2013.01); *G06F 17/2735* (2013.01); *G06F 17/30616* (2013.01);
(Continued)

(58) Field of Classification Search
CPC .............................. G06F 17/21; G06F 17/273
See application file for complete search history.

(56) References Cited

U.S. PATENT DOCUMENTS

| | | |
|---|---|---|
| 8,601,019 B1 | 12/2013 | Weininger et al. |
| 8,782,556 B2 | 7/2014 | Badger et al. |

(Continued)

FOREIGN PATENT DOCUMENTS

| | | |
|---|---|---|
| WO | 2008065549 A1 | 6/2008 |
| WO | 2008120033 A1 | 10/2008 |
| WO | 2014089524 A1 | 6/2014 |

OTHER PUBLICATIONS

Gardiner, "iPhone 6 and iOS 8: 16 hidden features", Telegraph, Sep. 10, 2014, © Copyright of Telegraph Media Group Limited 2015, pp. 1-5, <http://www.telegraph.co.uk/technology/apple/11086279/iPhone-6-and-iOS-8-16-hidden-features.html>.

(Continued)

*Primary Examiner* — Stephen Hong
*Assistant Examiner* — Ahamed I Nazar
(74) *Attorney, Agent, or Firm* — Christopher K. McLane; Alexander G. Jochym; Maeve M. Carpenter (57) ABSTRACT

In an approach to text prediction, a computer detects an initialization of a text-based communication between a first user and a second user. The computer determines whether a predictive text dictionary associated with the second user exists, wherein the predictive text dictionary is based, at least in part, on a history of communication between the first user and the second user. Responsive to determining a predictive text dictionary associated with the second user exists, the computer receives the text-based communication. The computer determines whether one or more words are detected in the text-based communication that do not exist in the predictive text dictionary associated with the second user. Responsive to determining one or more words are detected that do not exist in the predictive text dictionary associated with the second user, the computer adds the one or more new words to the predictive text dictionary associated with the second user.

6 Claims, 4 Drawing Sheets

(51) Int. Cl.
*G06F 17/30* (2006.01)
*H04W 8/20* (2009.01)
*H04L 29/08* (2006.01)
*H04L 12/58* (2006.01)

(52) U.S. Cl.
CPC .......... *H04L 67/306* (2013.01); *H04W 8/205* (2013.01); *H04L 51/063* (2013.01); *H04L 67/00* (2013.01)

(56) References Cited

U.S. PATENT DOCUMENTS

| | | | | |
|---|---|---|---|---|
| 8,903,719 | B1* | 12/2014 | Landry | G06F 17/21 |
| | | | | 704/10 |
| 2002/0143828 | A1* | 10/2002 | Montero | G06F 17/273 |
| | | | | 715/257 |
| 2003/0145285 | A1 | 7/2003 | Miyahira et al. | |
| 2008/0313182 | A1* | 12/2008 | Vasa | G06F 3/023 |
| 2009/0306969 | A1* | 12/2009 | Goud | G06F 17/2735 |
| | | | | 704/10 |
| 2013/0060560 | A1* | 3/2013 | Mahkovec | G06F 17/273 |
| | | | | 704/9 |
| 2013/0211824 | A1* | 8/2013 | Tseng | G06F 17/273 |
| | | | | 704/10 |
| 2013/0283156 | A1* | 10/2013 | Al Badrashiny | G06F 17/273 |
| | | | | 715/257 |
| 2013/0325445 | A1 | 12/2013 | Fux et al. | |
| 2014/0012568 | A1 | 1/2014 | Caskey et al. | |
| 2014/0163954 | A1* | 6/2014 | Joshi | G06F 17/276 |
| | | | | 704/9 |
| 2014/0267045 | A1* | 9/2014 | Grieves | G06F 17/2735 |
| | | | | 345/168 |
| 2014/0379813 | A1* | 12/2014 | Charania | H04L 51/02 |
| | | | | 709/206 |
| 2015/0310095 | A1* | 10/2015 | Weksler | G06F 3/04842 |
| | | | | 707/723 |
| 2016/0224540 | A1* | 8/2016 | Stewart | G06F 17/273 |
| 2017/0017639 | A1 | 1/2017 | Bute et al. | |

OTHER PUBLICATIONS

"Autocomplete", From Wikipedia, the free encyclopedia, Last modified: May 4, 2015, pp. 1-6, <http://en.wikipedia.org/w/index.php?title=Autocomplete&oldid=660777715>.

"Autocomplete, or Word completion", Ghotit, Posted by admin in Gotit Blogs, Printed on: May 18, 2015, Copyright © 2012, Ghotit ltd., pp. 1-3, <http://www.ghotit.com/2012/09/autocomplete-word-completion-word-prediction/>.

"Boxer Text Editor", Boxer Software, Printed on: May 18, 2015, Copyright © 2015 by Boxer Software, pp. 1-14, <http://www.boxersoftware.com/pgfeat.htm>.

"Integrated development environment", From Wikipedia, the free encyclopedia, Last Modified: Mar. 12, 2015, pp. 1-4, <http://en.wikipedia.org/wiki/Integrated_development_environment>.

"TED Notepad", From Wikipedia, the free encyclopedia, Last Modified: Apr. 10, 2015, pp. 1-4, <http://en.wikipedia.org/wiki/TED_Notepad#Context_completion>.

List of IBM Patents or Patent Applications Treated as Related (Appendix P), filed herewith.

* cited by examiner

USER BASED TEXT PREDICTION

BACKGROUND OF THE INVENTION

The present invention relates generally to the field of data processing, and more particularly to text prediction based on a user-specific dictionary.

Computers and other electronic devices, such as mobile phones and tablets, are widely used for text-based communication in the connected world. Various communication applications are available to facilitate staying connected with friends, family members, and professional colleagues. To aid a user in typing quickly and accurately, many of the communication applications incorporate features for word completion or text prediction.

Word completion, or autocomplete, is a feature in a communication or messaging application which predicts the rest of a word a user is typing based on the first letters typed. Word completion speeds up human-computer interactions by correctly predicting words being typed. Context completion is a text editor feature, similar to word completion, which completes words (or entire phrases) based on the current context and context of other similar words within the same document, or within some training data set. An advantage of context completion over word completion is the ability to predict anticipated words more precisely and even with no initial letters.

SUMMARY

Embodiments of the present invention disclose a method, a computer program product, and a system for text prediction. The method may include a computer detecting an initialization of a text-based communication between a first user and a second user. The computer determines whether a predictive text dictionary associated with the second user exists, wherein the predictive text dictionary is based, at least in part, on a history of communication between the first user and the second user. Responsive to determining a predictive text dictionary associated with the second user exists, the computer receives the text-based communication. The computer determines whether one or more words are detected in the text-based communication that do not exist in the predictive text dictionary associated with the second user. Responsive to determining one or more words are detected that do not exist in the predictive text dictionary associated with the second user, the computer adds the one or more new words to the predictive text dictionary associated with the second user.

DETAILED DESCRIPTION

Word completion and text prediction algorithms are often based on a base common language dictionary, pre-loaded on a computing device, to aid a user in text-based messaging. The dictionary used for text prediction is generic, static, and common for all communications. When two or more parties are involved in a communication, they may communicate in a particular pattern, for example, friendly, casual, or professional. Such conversation may evolve around a common area of interest. In future communications, the involved parties are more likely to communicate in the same pattern and use many of the same words and phrases that were part of previous communications. The involved parties use words and phrases that are part of a specific shared vocabulary which may not exist in a base common language dictionary, nor would the involved parties use the words or phrases in communications with another party. Text prediction algorithms generally do not use communication history between parties for word or phrase completion. Embodiments of the present invention recognize that efficiency and accuracy of text prediction in messaging may be gained by using a dynamically created, user-specific dictionary based on a history of communication with a user in addition to a base dictionary. Embodiments of the present invention also recognize that efficiency and accuracy of messaging may be gained by retrieving unique words and phrases from a user profile and adding the words and phrases to the user-specific dictionary. Implementation of embodiments of the invention may take a variety of forms, and exemplary implementation details are discussed subsequently with reference to the Figures.

Figure 1:
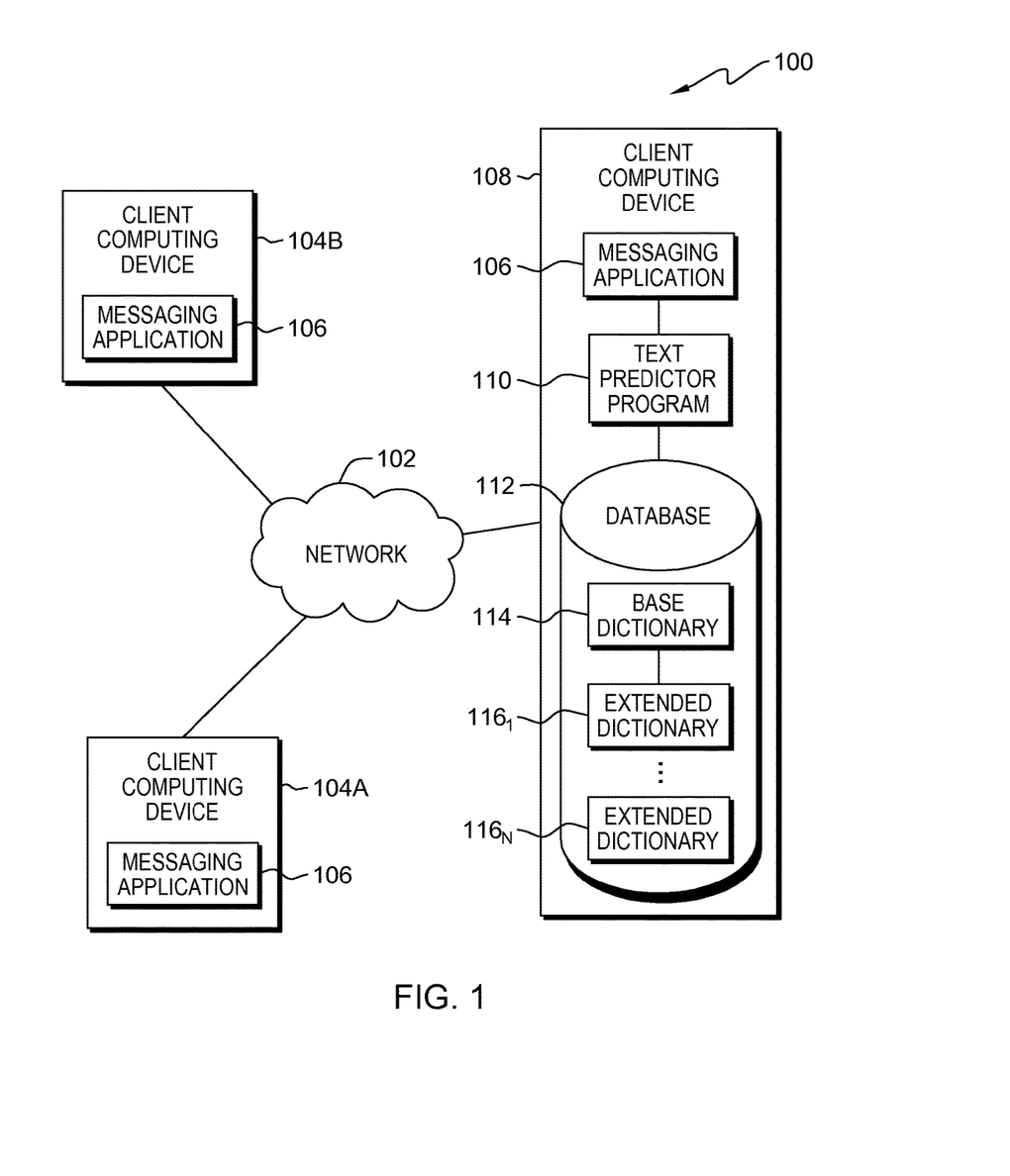
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104A, client computing device 104B, and client computing device 108, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 104A, client computing device 104B, client computing device 108, and other computing devices (not shown) within distributed data processing environment 100.

Client computing device 104A and client computing device 104B each represent one or more client computing devices with which the user of client computing device 108 communicates, via network 102. Client computing device 104A, client computing device 104B, and client computing device 108 can each be a laptop computer, a tablet computer, a smart phone, or any programmable electronic device capable of communicating with various components and devices within distributed data processing environment 100, via network 102. In general, client computing device 104A, client computing device 104B, and client computing device 108 each represent any programmable electronic device or combination of programmable electronic devices capable of executing machine readable program instructions and communicating with other computing devices (not shown) within distributed data processing environment 100 via a network, such as network 102. Client computing device 104A, client computing device 104B, and client computing device 108 each include messaging application 106. In addition, client computing device 108 includes text predictor program 110 and database 112.

Messaging application 106 is one of a plurality of computer programs used for text based message communications between one or more users. Messaging application 106 may be, for example, an email application, a mobile phone text message application, a smart phone text message application, an instant messaging application, or the like.

Text predictor program 110 resides on client computing device 108. In one embodiment, text predictor program 110 is a standalone program. In another embodiment, text predictor program 110 is integrated into messaging application 106. A predictive text dictionary is a stored dictionary used by a text-based messaging application, such as messaging application 106, to predict and insert text into a message for a user. Text predictor program 110 predicts words or phrases a user plans to type into a message by creating a user-specific, predictive text dictionary, such as extended dictionary 1161, based on a history of communication with a particular user or group, such as the user of client computing device 104A. The predictive text dictionary for a group may also include an intersection of individual extended dictionaries of the members of the group. By merging extended dictionary 1161 with base dictionary 114, text predictor program 110 enables a user to more efficiently and accurately type a message. As a communication begins, text predictor program 110 determines whether an extended dictionary exists for the party or group with which the user of client computing device 108 is communicating. If an extended dictionary does not exist for the user or group, then text predictor program 110 creates an extended dictionary. As the communication progresses, text predictor program 110 adds new or unique words and phrases from the current communication to the extended dictionary for use in a subsequent communication. Text predictor program 110 may also augment extended dictionary 1161 by retrieving unique words and phrases from a user profile that represent a user's interests and background. Text predictor program 110 is depicted and described in further detail with respect to FIG. 2 and FIG. 3.

Database 112 resides on client computing device 108. In another embodiment, database 112 can reside elsewhere in distributed data processing environment 100, for example, on a server computer associated with messaging application 106 (not shown). A database is an organized collection of data. Database 112 can be implemented with any type of storage device capable of storing data and configuration files that can be accessed and utilized by client computing device 108, such as a database server, a hard disk drive, or a flash memory. Database 112 stores base dictionary 114. Database 112 also stores extended dictionaries 1161 through 116N, once text predictor program 110 creates extended dictionaries 1161 through 116N.

Base dictionary 114 is a base predictive text dictionary used by text predictor program 110 for text prediction in messaging application 106. In one embodiment, base dictionary 114 is a static dictionary which was pre-loaded onto client computing device 108. In another embodiment, base dictionary 114 may be included in messaging application 106.

Extended dictionaries 1161 through 116N represent user-specific, text prediction dictionaries, or extended dictionaries, created by text predictor program 110 for users of client computing device 104A and client computing device 104B, where the letter "N" indicates an integer greater than one. Text predictor program 110 may create an extended dictionary, such as extended dictionaries 1161 through 116N for each user or group with which the user of client computing device 108 communicates. For example, extended dictionary 1161 is associated with a user of a first client computing device, such as client computing device 104A, while an extended dictionary 1162 (not shown) is associated with a user of a second client computing device, such as another client computing device within a group of client computing devices 104A or a single client computing device 104B. Extended dictionaries 1161 through 116N each include words and phrases from historical communications with a specific user or group. Extended dictionaries 1161 through 116N may also include words and phrases extracted from user profiles and social networks. Extended dictionaries 1161 through 116N stored in database 112 may be produced from a copy of extended dictionaries that reside in memory.

Figure 2:
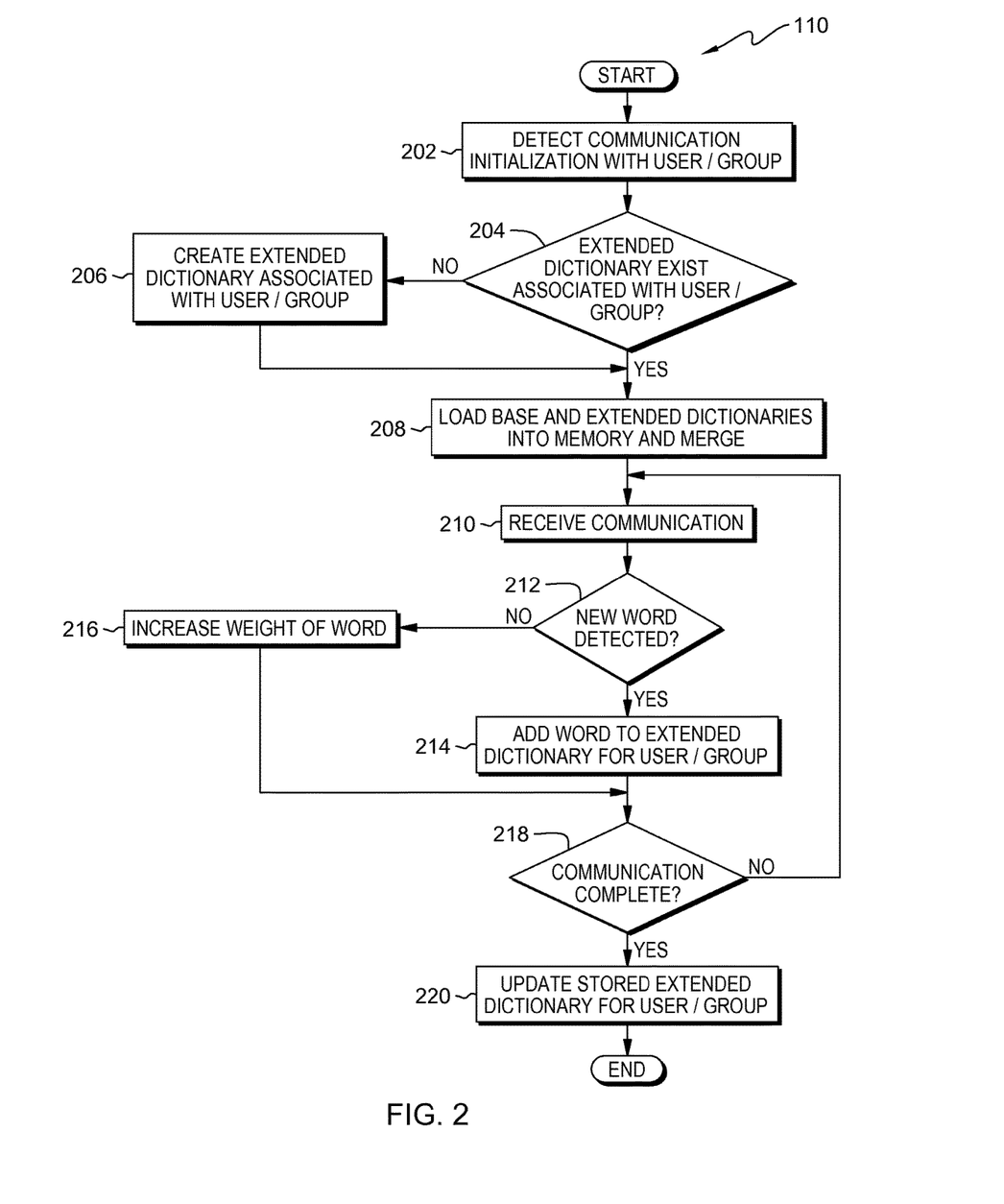
FIG. 2 is a flowchart depicting operational steps of a text predictor program, on a client computing device within the distributed data processing environment of FIG. 1, for predicting text based on a user-specific dictionary, in accordance with an embodiment of the present invention.

FIG. 2 is a flowchart depicting operational steps of text predictor program 110, on client computing device 108 within distributed data processing environment 100 of FIG. 1, for predicting text based on a user-specific dictionary, in accordance with an embodiment of the present invention.

Text predictor program 110 detects a communication initialization with a user or a group (step 202). When a user of client computing device 108 either begins or receives a text-based communication with a user or group, text predictor program 110 detects an initialization of the communication. The communication may be via one of a plurality of text-based communications, such as email, instant message, text on a smart phone, etc. Initialization of a communication can be, for example, the user addressing an email to another user. Initialization of a communication can also be, for example, the receipt of a text message from another user.

Text predictor program 110 determines whether an extended dictionary associated with the user or group exists (decision block 204). Text predictor program 110 identifies the user or group with which the communication is initialized and searches database 112 for the existence of an extended dictionary, such as extended dictionary 1161, for the user or group. If text predictor program 110 determines that an extended dictionary associated with the user or group does not exist ("no" branch, decision block 204), then text predictor program 110 creates an extended dictionary associated with the user or group (step 206). Text predictor program 110 creates an extended dictionary in memory for updating during the current communication with the identified user or group. For example, text predictor program 110 may create extended dictionary 1161 associated with the user of client computing device 104A. Text predictor program 110 may also create an extended dictionary in database 112 associated with the identified user or group. In one embodiment, text predictor program 110 may create a separate extended dictionary for each messaging application. For example, the user's conversations via text message may be less formal than messages typed into an email, and therefore the user may be more likely to use different words or phrases in one messaging application versus another. In one embodiment, text predictor program 110 may prompt the user of client computing device 108 with an option to create an extended dictionary for the user or group with which the user of client computing device 108 is currently communicating. For example, the user of client computing device 108 may decide that creation of an extended dictionary for a particular user or group is not necessary because the user expects communication with the current user or group to be a low frequency event. In the embodiment, text predictor program 110 may display a message on the screen which queries the user as to whether the user wants text predictor program 110 to create an extended dictionary. In another embodiment, a user may define preferences in advance of a communication regarding the type of user or group for which text predictor program 110 creates an extended dictionary. For example, the user of client computing device 108 may define particular company names or email extensions for which creation of an extended dictionary is not necessary.

In response to creating an extended dictionary, or if text predictor program 110 determines that an extended dictionary associated with the user or group exists ("yes" branch, decision block 204), then text predictor program 110 loads a base dictionary, such as base dictionary 114, and extended dictionary 116I into memory and merges the dictionaries (step 208). In one embodiment, text predictor program 110 loads base dictionary 114 and extended dictionary 116I from database 112 into memory, for example, random access memory (RAM), for access during runtime. In another embodiment, messaging application 106 automatically loads base dictionary 114 into memory upon communication initialization, and text predictor program 110 loads extended dictionary 116I from database 112 into memory. Text predictor program 110 merges the dictionaries for use in predicting text, i.e., word suggestion, in the current communication, as will be apparent to those of ordinary skill in the art. In an embodiment where text predictor program 110 created extended dictionary 116I in step 206, extended dictionary 116I may be empty before communication begins. In the embodiment, text predictor program 110 uses base dictionary 114 for word suggestion in the current communication. In an embodiment where the user is communicating with a group, in addition to loading an extended dictionary for the group, text predictor program 110 determines whether one or more extended dictionaries for the members of the group exist, and determines an intersection between the members' dictionaries, i.e., a subset of the members' dictionaries that is common to all members. In the embodiment, text predictor program 110 merges the intersection of the members' dictionaries with base dictionary 114 and the group extended dictionary.

Text predictor program 110 receives communication (step 210). In one embodiment, text predictor program 110 receives the beginning of a communication from the user of client computing device 108, i.e., the user of client computing device 108 begins to type a message in messaging application 106. In another embodiment, text predictor program 110 receives the beginning of a communication when messaging application 106 receives a message from another user or group.

Text predictor program 110 determines if text predictor program 110 detects a new word (decision block 212). As the communication progresses, either by the user of client computing device 108 typing a message, or within a received message, text predictor program 110 determines whether text predictor program 110 detects a word or phrase that does not exist in either base dictionary 114 or extended dictionary 116I. If text predictor program 110 determines that text predictor program 110 detects a new word ("yes" branch, decision block 212), then text predictor program 110 adds the word to the extended dictionary for the user or group (step 214). In response to detecting a new word or phrase, text predictor program 110 stores the new word or phrase in the extended dictionary loaded in memory corresponding to the user or group with which the user of client computing device 108 is communicating. For example, text predictor program 110 stores the new word or phrase in extended dictionary 116N for the user of client computing device 104B.

If text predictor program 110 determines that text predictor program 110 detects a word that already exists in the extended dictionary ("no" branch, decision block 212), then text predictor program 110 increases the weight of the word (step 216). Text predictor program 110 assigns weights to words and phrases within an extended dictionary. Text predictor program 110 assigns a higher weight to words and phrases used more frequently by the user of client computing device 108 or by the user or group associated with the extended dictionary. While predicting text for the user of client computing device 108, text predictor program 110 chooses words or phrases with higher weights when suggesting a next word or phrase to be typed or added to the communication.

Responsive to adding a new word to the extended dictionary or increasing the weight of a word that already exists in the extended dictionary, text predictor program 110 determines if the communication is complete (decision block 218). In one embodiment, the communication is complete when the user of client computing device 108 sends the message. In another embodiment, the communication is complete upon opening of a received message. If text predictor program 110 determines the communication is not complete ("no" branch, decision block 218), then text predictor program 110 returns to step 210 and continues to receive communication until the user exits messaging application 106.

If text predictor program 110 determines the communication is complete ("yes" branch, decision block 218), then text predictor program 110 updates the stored extended dictionary for the user or group (step 220). In one embodiment, in response to the completion of the communication, text predictor program 110 copies the extended dictionary currently in memory to the extended dictionary associated with the same user or group stored in database 112. In another embodiment, text predictor program 110 copies the extended dictionary currently in memory to the extended dictionary associated with the same user or group stored in database 112 dynamically, as the communication progresses. In a further embodiment, text predictor program 110 may overwrite or replace the extended dictionary associated with the same user or group stored in database 112 with the extended dictionary currently in memory. In yet a further embodiment, text predictor program 110 may store the extended dictionary in a local cache memory (not shown). Text predictor program 110 may use one or more types of data structures to optimize the storage and access of the words in the extended dictionary. For example, text predictor program 110 may use trie data structures, as will be apparent to those of ordinary skill in the art. With the updated extended dictionaries stored in database 112, text predictor program 110 can retrieve the latest extended dictionary for the next communication between the user of client computing device 108 and the user or group associated with the particular extended dictionary.

Figure 3:
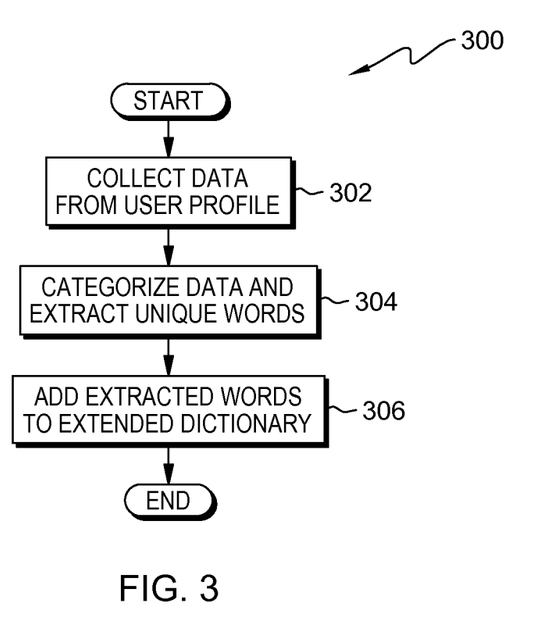
FIG. 3 is a flowchart depicting operational steps of the text predictor program, on the client computing device within the distributed data processing environment of FIG. 1, for augmenting a user-specific dictionary, in accordance with an embodiment of the present invention.

FIG. 3 is a flowchart depicting operational steps of text predictor program 110, on client computing device 108 within distributed data processing environment 100 of FIG. 1, for augmenting a user-specific dictionary, in accordance with an embodiment of the present invention.

In flowchart 300, text predictor program 110 collects data from a user profile (step 302). In an effort to augment an existing extended dictionary associated with a particular user or group, text predictor program 110 analyzes information available in the associated user's profile in one or more social networks or messaging applications. For example, a user may have a profile in a social network that describes the user's work experience or hobbies. In another example, a company's internal instant messaging system may be linked to the company's internal address book which lists the user's work location and projects in which the user is involved. In one embodiment, a system administrator may set text predictor program 110 to check, at a regular time interval, the user profiles of each user or group with which a corresponding extended dictionary exists on database 112. In another embodiment, the user of client computing device 108 can define a preference for the frequency with which text predictor program 110 checks user profiles. In a further embodiment, text predictor program 110 may check a user profile subsequent to any additional communication with that particular user or group. In yet a further embodiment, a user may add words or phrases to an extended dictionary at the user's discretion.

Text predictor program 110 categorizes data and extracts unique words (step 304). Text predictor program 110 analyzes the data found in the one or more user profiles to categorize the data. For example, text predictor program 110 may categorize data relating to a user's hobbies under "interests." In another example, text predictor program 110 may categorize data relating to a user's work location under "travel" or "occupation." Text predictor program 110 may use the categories to find areas of intersection between the user of client computing device 108 and the user or group associated with the extended dictionary. Text predictor program 110 extracts unique words or phrases that may come up in a future communication with the user of client computing device 108 from the profile data, based on a history of communication between the user of client computing device 108 and the user with whom the extended dictionary is associated.

Text predictor program 110 adds extracted words to the extended dictionary (step 306). In an embodiment, text predictor program 110 compares the extracted words to the existing extended dictionary associated with the user to determine whether the extracted words are already included in the extended dictionary prior to adding the extracted words to the extended dictionary. Text predictor program 110 augments the existing extended dictionary by pushing newly found words and phrases to the extended dictionary in database 112. By augmenting the extended dictionary, text predictor program 110 is more likely to predict the user's text while messaging with the user or group corresponding to the extended dictionary in a faster and more accurate manner because words or phrases associated with likely topics between the two parties are available for suggestion.

Figure 4:
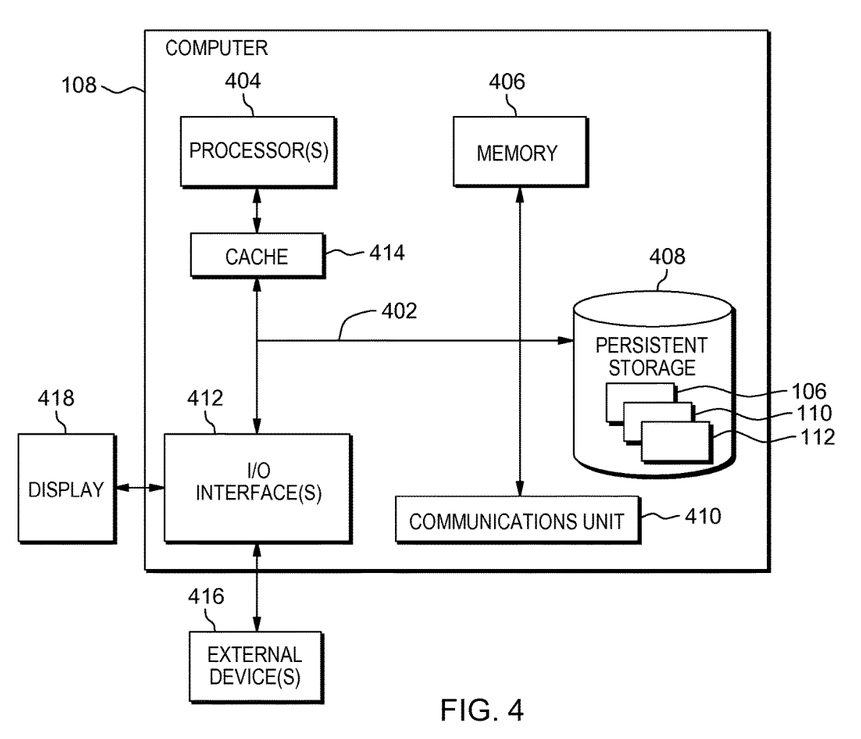
FIG. 4 depicts a block diagram of components of the client computing device executing the text predictor program within the distributed data processing environment of FIG. 1, in accordance with an embodiment of the present invention.

FIG. 4 depicts a block diagram of components of client computing device 108 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Client computing device 108 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., messaging application 106, text predictor program 110, and database 112 are stored in persistent storage 408 for execution and/or access by one or more of the respective processor(s) 404 of client computing device 108 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 104A and client computing device 104B. In these examples, communications unit 410 includes one or more network interface cards. Communications unit 410 may provide communications through the use of either or both physical and wireless communications links. Messaging application 106, text predictor program 110, and database 112 may be downloaded to persistent storage 408 of client computing device 108 through communications unit 410.

I/O interface(s) 412 allows for input and output of data with other devices that may be connected to client computing device 108. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., messaging application 106, text predictor program 110, and database 112 on client computing device 108, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for text prediction, the computer program product comprising:
    one or more computer readable storage media and program instructions stored on the one or more computer readable storage media, the stored program instructions comprising:
    program instructions to detect an initialization of a text-based communication between devices associated with three or more members of a group;
    program instructions to determine whether a group predictive text dictionary associated with the group exists, wherein the group predictive text dictionary is based, at least in part, on a history of communication between the three or more members of the group;
    program instructions to determine whether a first predictive text dictionary exists, wherein the first predictive dictionary is based, at least in part, on a history of communication between a first member of the group and a second member of the group;
    program instructions to determine whether a second predictive text dictionary exists, wherein the second predictive text dictionary is based, at least in part, on a history of communication between the first member of the group and a third member of the group;
    responsive to determining the first predictive text dictionary and the second predictive text dictionary exist, program instructions to determine an intersection of the first predictive text dictionary and the second predictive text dictionary, wherein the intersection is a subset of the first predictive text dictionary and the second predictive text dictionary that is common to both the first predictive text dictionary and the second predictive text dictionary;
    responsive to determining a group predictive text dictionary exists, program instructions to merge the intersection with the group predictive text dictionary;
    program instructions to receive the text-based communication;
    program instructions to determine whether one or more words are detected in the received text-based communication that do not exist in the group predictive text dictionary; and
    responsive to determining one or more words are detected that do not exist in the group predictive text dictionary, program instructions to add the one or more new words to the group predictive text dictionary.

2. The computer program product of claim 1, the stored program instructions further comprising, responsive to determining a group predictive text dictionary does not exist, program instructions to create a group predictive text dictionary, based, at least in part, on the text-based communication between the three or more members of the group.

3. The computer program product of claim 1, the stored program instructions further comprising program instructions to predict text to be added to the text-based communication by the first member of the group, based, at least in part, on the group predictive text dictionary.

4. A computer system for text prediction, the computer system comprising:
    one or more computer processors;
    one or more computer readable storage device;
    program instructions stored on the one or more computer readable storage device for execution by at least one of the one or more computer processors, the stored program instructions comprising:
    program instructions to detect an initialization of a text-based communication between devices associated with three or more members of a group;
    program instructions to determine whether a group predictive text dictionary associated with the group exists, wherein the group predictive text dictionary is based, at least in part, on a history of communication between the three or more members of the group;
    program instructions to determine whether a first predictive text dictionary exists, wherein the first predictive dictionary is based, at least in part, on a history of communication between a first member of the group and a second member of the group;
    program instructions to determine whether a second predictive text dictionary exists, wherein the second predictive text dictionary is based, at least in part, on a history of communication between the first member of the group and a third member of the group;
    responsive to determining the first predictive text dictionary and the second predictive text dictionary exist, program instructions to determine an intersection of the first predictive text dictionary and the second predictive text dictionary, wherein the intersection is a subset of the first predictive text dictionary and the second predictive text dictionary that is common to both the first predictive text dictionary and the second predictive text dictionary;
    responsive to determining a group predictive text dictionary exists, program instructions to merge the intersection with the group predictive text dictionary;
    program instructions to receive the text-based communication;
    program instructions to determine whether one or more words are detected in the received text-based communication that do not exist in the group predictive text dictionary; and
    responsive to determining one or more words are detected that do not exist in the group predictive text dictionary, program instructions to add the one or more new words to the group predictive text dictionary.

5. The computer system of claim 4, the stored program instructions further comprising, responsive to determining a group predictive text dictionary does not exist, program instructions to create a group predictive text dictionary, based, at least in part, on the text-based communication between the three or more members of the group.

6. The computer system of claim 4, the stored program instructions further comprising program instructions to predict text to be added to the text-based communication by the first member of the group, based, at least in part, on the group predictive text dictionary.

* * * * *